United States Patent
Gautier et al.

[19]

[11] Patent Number: 5,951,117
[45] Date of Patent: Sep. 14, 1999

[54] BOOSTED BRAKING SYSTEM WITH AUTOMATICALLY-CONTROLLED REACTION

[75] Inventors: Jean Pierre Gautier; Ulysse Verbo, both of Aulnay-Sous-Bois; Jacques Houplain, Courbevoie, all of France

[73] Assignee: Bosch Systemes de Freinage, Drancy, France

[21] Appl. No.: 08/860,691

[22] PCT Filed: Jun. 4, 1997

[86] PCT No.: PCT/FR97/00985

§ 371 Date: Jun. 11, 1997

§ 102(e) Date: Jun. 11, 1997

[87] PCT Pub. No.: WO98/05537

PCT Pub. Date: Feb. 12, 1998

[30] Foreign Application Priority Data

Aug. 5, 1996 [FR] France .................................. 96 09934

[51] Int. Cl.⁶ ...................................................... B60T 13/56
[52] U.S. Cl. .................. 303/24.1; 188/356; 303/22.1; 91/376 R; 91/374; 60/547.1; 60/533
[58] Field of Search .......................... 60/554, 545, 547.1, 60/577, 558, 593, 533; 91/367, 434, 376 R, 369.2, 369.1, 374, 369.4, 364, 361, 365; 188/356–359, 355, 181 T, 195, 72.4, 6, 346, 71.1, 347, 348, 73.42, 1.11 R; 303/22.1–22.8, 24.1, 9.67, 9.68, 112, 114.1, 50, 52, 113.3, 114.3

[56] References Cited

U.S. PATENT DOCUMENTS

| | | | |
|---|---|---|---|
| 3,434,759 | 3/1969 | Julow | 303/24.1 |
| 3,452,666 | 7/1969 | Julow | 303/24.1 |
| 4,491,058 | 1/1985 | Morin | 91/376 R |
| 5,154,056 | 10/1992 | Gautier et al. | 60/547.1 |
| 5,259,666 | 11/1993 | Castel | 188/356 |
| 5,275,265 | 1/1994 | Castel | 188/195 |
| 5,782,159 | 7/1998 | Gautier et al. | 91/376 R |

FOREIGN PATENT DOCUMENTS

| | | |
|---|---|---|
| 0203704 | 12/1986 | European Pat. Off. . |
| 0261011 | 3/1988 | European Pat. Off. . |
| 0283328 | 9/1988 | European Pat. Off. . |
| 2658466 | 8/1991 | France . |

*Primary Examiner*—Douglas C. Butler
*Attorney, Agent, or Firm*—Leo H McCormick, Jr.; Warren Comstock

[57] ABSTRACT

A boosted braking system for a motor vehicle having a master cylinder (200) and a pneumatic booster (100). The master cylinder (200) causes an increase in pressure of brake fluid supplied to at least one wheel brake (300). The pneumatic booster (100) is controlled by the application of an input force (F2) to a control rod (26) to actuate the master cylinder (200). A main hydraulic piston (30) of the master cylinder (200) has a hollow cylinder (32) in which a reaction piston (34) slides in a leaktight and axial direction. The reaction piston (34) receives at least the input force (F2). An elastic member (46) located between the reaction piston (34) and hollow cylinder (32) exerts an elastic force for urging the reaction piston (34) toward the master cylinder (200). The reaction piston (34) delimits within the cylinder a reaction chamber (36) which is isolated from the interior volume (V) of the master cylinder (200). The reaction chamber (34) receives hydraulic pressure supplied by at least one sensor (G,G') sensitive to variations in at least on physical magnitude in response to variation in the input force (F2).

10 Claims, 3 Drawing Sheets

BOOSTED BRAKING SYSTEM WITH AUTOMATICALLY-CONTROLLED REACTION

The present invention relates to boosted braking systems for motor vehicles, comprising a master cylinder controlling the hydraulic pressure in the brake circuit connected to the brakes of the vehicle, it being possible for this master cylinder to be actuated by a pneumatic booster when the driver of the vehicle depresses the brake pedal.

BACKGROUND OF THE INVENTION

In the conventional way, the master cylinder is full of brake fluid and equipped with a main hydraulic piston intended to receive an actuating force composed of an input force and of a boost force both acting in an axial direction.

On the other hand, the pneumatic booster can be controlled by application of the input force to a control rod controlling the opening of a valve so as to exert the actuating force on the main hydraulic piston of the master cylinder, the booster including a rigid casing divided in leaktight fashion into two chambers by means of a moving partition which can be acted upon by a difference in pressure between the two chambers resulting from the opening of the valve and drive along a pneumatic piston which can move with respect to the casing and which carries the valve, the input force being transmitted via a reaction disc against which the pneumatic piston also rests in order to impart at least some of the boost force thereto.

A device of this type is well known in the prior art and is described, for example, in document U.S. Pat. No. 4,491,058.

These braking devices have, as advantage, as a result of the use of a pneumatic piston which can move with respect to the rigid casing, the fact that the total travel available to the control rod, and therefore to the brake pedal, is relatively long, which constitutes a necessary condition in providing optimum control over the brake fluid pressure supplied to the brakes of the vehicle.

In parallel, boosted braking devices have been developed in which the reaction exerted on the control rod is supplied no longer mechanically by a reaction disc, but by the hydraulic pressure prevailing in the master cylinder.

In these devices, the main hydraulic piston of the master cylinder itself includes a hollow moving cylinder communicating with the master cylinder, receiving at least some of the boost force, and inside which there slides, in leaktight fashion and in the axial direction, a reaction piston which can receive at least the input force, elastic means exerting an elastic force between the reaction piston and the moving cylinder and urging the reaction piston towards the master cylinder, at least one opening being made in the moving cylinder to make the inside thereof communicate with the inside of the master cylinder.

Such a device is described, for example, in document FR-A-2,658,466.

These devices with hydraulic reaction have the main advantage that irrespective of the intensity of the braking action or the rate of application of the input force, their characteristic operating curve, namely the curve giving the pressure in the master cylinder as a function of the intensity of the input force on the booster, is unchanged.

However, all these boosted braking devices, whether they have mechanical reaction or hydraulic reaction, allow only the hydraulic pressure supplied to the wheel brakes to be controlled, but do not allow all the parameters involved in the braking of a motor vehicle to be taken into account.

One important parameter involved in braking is the coefficient of adherence between the wheel to be braked and the ground over which it is running. During a braking action, this coefficient can vary greatly, for example if the vehicle hits a portion of wet ground while the driver is braking on dry ground. As the adherence of the wheels to the ground in such a case is then appreciably lower, there is the risk of the wheels locking and the vehicle skidding.

SUMMARY OF THE INVENTION

The present invention falls within this context, and its object is to propose a boosted braking system in which the feel felt by the driver when he depresses the brake pedal is improved, and especially one in which the driver can easily control the evolution of a braking parameter which represents this braking better than the hydraulic pressure sent to the brakes, it being necessary for such a braking system in addition to be of low cost while operating reliably under all circumstances.

To this end, the present invention proposes a boosted braking system for a motor vehicle, comprising on the one hand a master cylinder full of brake fluid and equipped with a main hydraulic piston intended to receive an actuating force composed of an input force and of a boost force both acting in an axial direction, and on the other hand a pneumatic booster which can be controlled by application of the input force to a control rod integral with a plunger controlling the opening of a three-way valve so as to exert the actuating force on the main hydraulic piston, the booster including a rigid casing divided in leaktight fashion into at least two chambers by means of at least one moving partition which can be acted upon by a difference in pressure between the two chambers resulting from the opening of the three-way valve and drive along a pneumatic piston which can move with respect to the casing, carrying the three-way valve and contributing at least to transmitting the boost force, the main hydraulic piston of the master cylinder itself including a hollow moving cylinder receiving at least some of the boost force and inside which there slides, in leaktight fashion and in the axial direction, a reaction piston which can receive at least the input force, elastic means exerting an elastic force between the reaction piston and the moving cylinder and urging the reaction piston towards the master cylinder.

Such a boosted braking device is known, for example, from document EP-B-0,443,886.

According to the present invention, the reaction piston delimits in the moving cylinder a reaction chamber isolated from the interior volume of the master cylinder and in which the hydraulic pressure supplied by at least one sensor sensitive to variations in at least one physical magnitude in response to the variations in the input force prevails.

Thanks to this arrangement, the feel felt by the driver when he depresses the brake pedal is the one associated with the evolution in the physical magnitude, such as the deceleration of the vehicle, for example, which is then more easy to control.

According to one embodiment, in which the wheel brake includes at least one friction pad which can be brought into frictional contact with a rotating element integral with a wheel of the vehicle when the brake fluid pressure in the wheel brake increases, the invention makes provision for the sensor piston is in abutment on the friction pad under the effect of urging from second elastic means.

According to another embodiment, the sensor includes at least one inertial mass which can move in a direction parallel to the direction of travel of the vehicle and is able to shift the sensor piston in its bore.

According to yet another embodiment, the sensor includes a sensor piston subjected to the action of a suspension spring associated with a damper of the vehicle.

Further objects, features and advantages of the invention will emerge clearly from the description which follows of embodiments given by way of non-limiting examples with reference to the appended drawings.

DETAILED DESCRIPTION OF THE INVENTION

In so far as the invention relates merely to an improvement made to pneumatically boosted braking systems, and as the overall construction and operation of such systems are well known to those skilled in the art, these systems will be recalled here briefly merely to give a complete understanding of the improvement that the invention represents.

Schematically, a system of this type comprises a booster 100 and a master cylinder 200 intended to actuate a brake motor 300.

The booster 100 is designed to be fixed in the usual way to a bulk head (not represented) separating the engine bay of a vehicle from the passenger compartment of this vehicle and to be actuated by a brake pedal (not represented) situated in this passenger compartment. The master cylinder 200 controlling the hydraulic brake circuit of the vehicle is fixed to the front wall of the booster 100.

Figure 1:
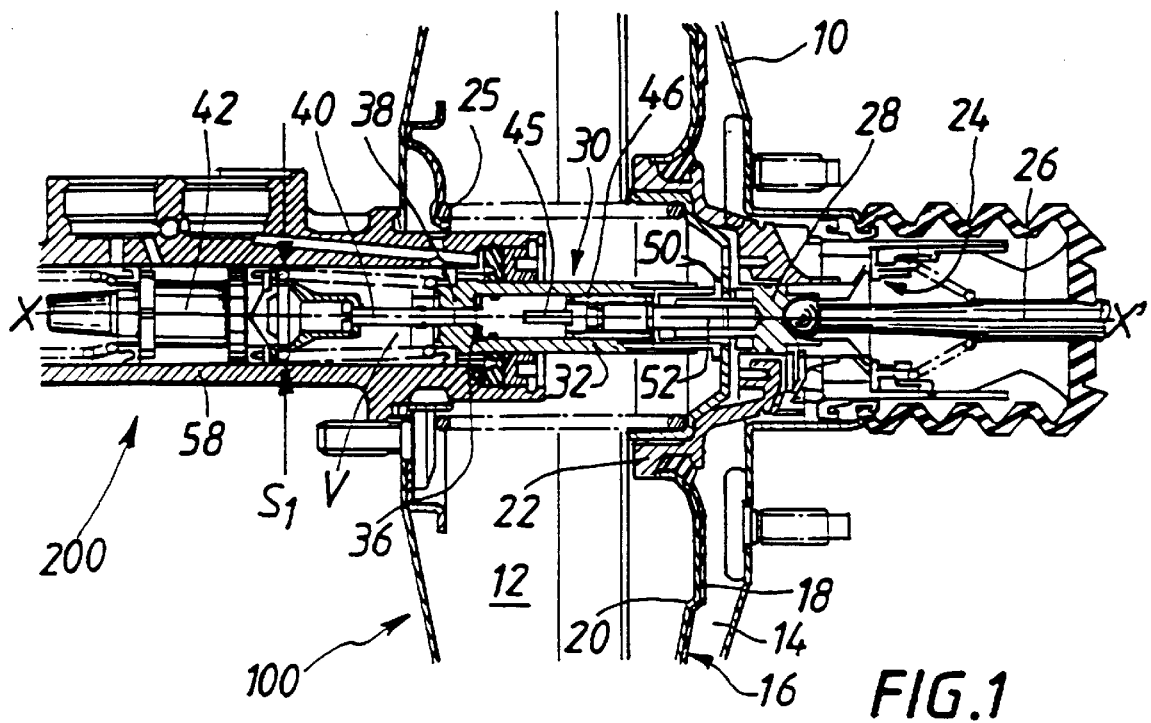
FIG. 1 represents a view in section of a boosted braking device forming part of the boosted braking system produced in accordance with the present invention.
Figure 2:
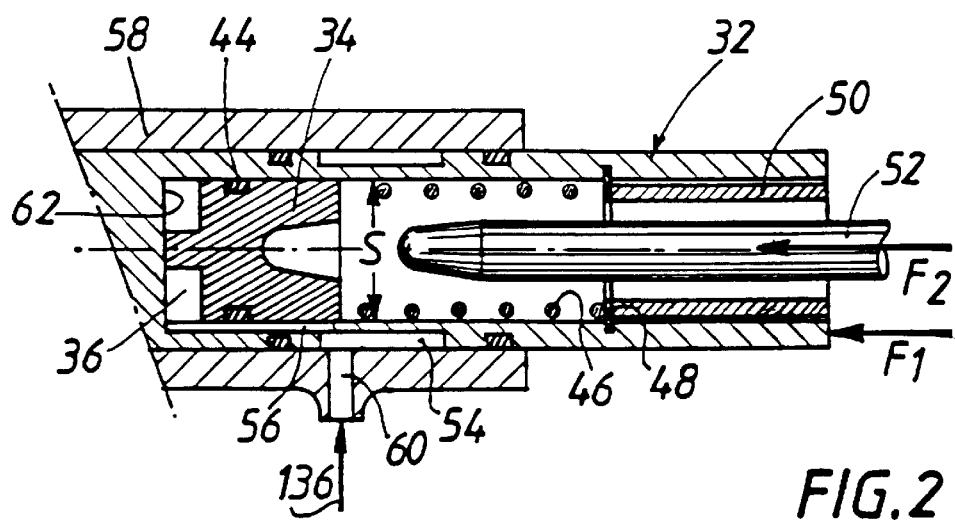
FIG. 2 represents a view in section on a larger scale of the central part of the device of FIG. 1.

By convention, that part of the booster/master cylinder assembly which points towards the master cylinder 200 is known as the "front" and that part of this assembly which points towards the brake pedal 12 is known as the "rear". In FIGS. 1 and 2, the front is thus to the left and the rear to the right.

The booster 100 itself comprises a rigid casing 10, the interior volume of which is divided into a front chamber 12 and a rear chamber 14, in leaktight fashion, by a moving partition 16 comprising a membrane 18 and a rigid skirt 20 and capable of driving along a pneumatic piston 22 which can move inside the casing 10.

The front chamber 12, the front face of which is closed in leaktight fashion by the master cylinder 200, is permanently connected to a source of partial vacuum (not represented). The pressure in the rear chamber 14 is controlled by a three-way valve 24 controlled by a control rod 26 connected to the brake pedal and integral with a plunger 28.

When the control rod 26 is in the position of rest, that is to say pulled towards the right, the valve 24 establishes a communication between the two chambers 12 and 14 of the booster. As the rear chamber 14 is then subjected to the same partial vacuum as the front chamber 12, the piston 22 is pushed back towards the right, into the position of rest, by a spring 25.

Actuation of the control rod 26 towards the left has the effect, first of all, of shifting the valve 24 so that it isolates the chambers 12 and 14 from one another then, secondly, of shifting this valve in such a way that it opens the rear chamber 14 to atmospheric pressure.

The difference in pressure between the two chambers 12 and 14 then felt by the membrane 18 exerts on the moving partition 16 a thrust which tends to shift it towards the left and allow it to drive along the piston 22 which in turn is shifted, compressing the spring 25.

The brake boosting force $F_1$, or "boost force", resulting from the thrusting of the moving partition 16, and the braking force $F_2$ exerted on the control rod 26, or "input force" are then applied together in the direction of the axis X-X' of the booster 100 in the direction of the master cylinder 200 and combined to constitute the actuating force therefor.

More specifically, the actuating force $F_1$ is applied to the main hydraulic piston 30 of the master cylinder and causes it to shift towards the left (in FIGS. 1 and 2), which leads to a rise in pressure in the brake fluid present in the interior volume V of the master cylinder 200, and actuation of the brake motor 300 connected thereto, as is well known in the technical field of braking.

As better seen in FIG. 2, the main hydraulic piston 30 is in fact composite and comprises, on the one hand, a moving and hollow cylinder 32 and, on the other hand, a reaction piston 34.

The interior volume of the hollow moving cylinder 32 is separated from the interior volume V of the master cylinder 200 by a leaktight wall 38, to which a device 40 for adjusting the separation between the moving cylinder 32, constituting the primary piston of the master cylinder, and the secondary piston 42 of the master cylinder may be fixed.

The reaction piston 34 slides in leaktight fashion in the moving cylinder 32 by means of an annular seal 44 and delimits therewith a reaction chamber 36. In addition, the reaction piston 34 is urged forwards by a spring 46 resting against a shoulder 48 of the moving cylinder 32, as has been represented in FIG. 1.

The moving cylinder 32 is connected, via a ring 50, to the rigid skirt 20 in such a way as to receive at least some of the boost force $F_1$ exerted by this rigid skirt 20. Advantageously, as will be seen later, the shoulder 48 is formed at the front end of the ring 50.

The reaction piston 34 is arranged axially, facing a thrust rod 52 integral with the plunger 28 and capable of transmitting thereto at least the input force $F_2$ exerted on the control rod 26 itself integral with the plunger 28.

In addition, the moving cylinder 32 is formed with a peripheral groove 54, connected by a duct 56 to the reaction chamber 36. The axial length of the groove 54 is such that irrespective of the position of the moving cylinder 32 with respect to the body 58 of the master cylinder, it is always in communication with an opening 60 made in the body 58. In this way, the reaction chamber is in permanent communication with the opening 60.

The operation of the boosted braking system described hitherto will now be explained.

At rest, the various moving parts occupy the position represented in FIGS. 1 and 2, and in particular the reaction piston 34 is in abutment towards the front on the bottom 62 of the moving cylinder 32 under the effect of the urging of a spring 46. The valve 24 allows communication between the two chambers 12 and 14, which are therefore at the same reduced pressure.

Figure 5:
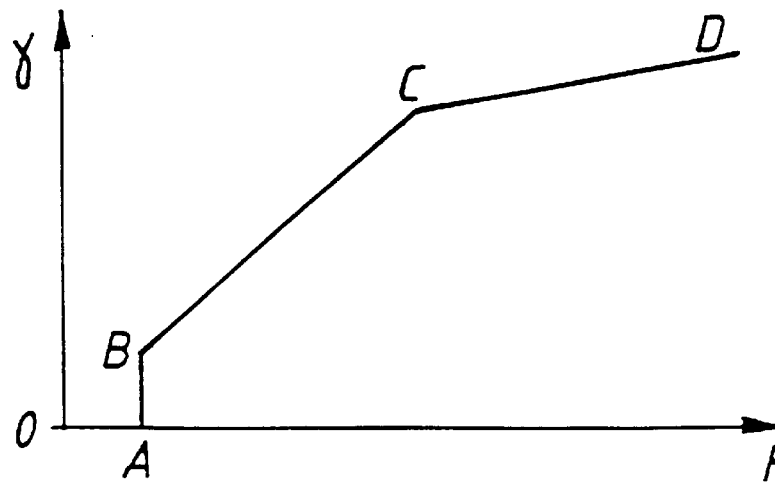
FIG. 5 represents the characteristic operating curve of the boosted braking system in accordance with the present invention, and represents the variations in deceleration of the vehicle as a function of the force applied to the brake pedal.

A first force on the brake pedal serves to overcome the preload of the spring of the control rod 26 and bring the valve 24 into a position in which it isolates the two chambers 12 and 14 from one another. This increase in force on the brake pedal therefore provides no increase in pressure in the master cylinder, and therefore no deceleration of the vehicle, and is represented in the curve of FIG. 5 by the segment OA. Adjusting the preload at rest of the spring of the ontrol rod makes it possible to adjust the length of he segment OA to any desired value.

After this predetermined travel of the control rod 26, the valve 24 opens the rear chamber 14 of the booster 100 to atmosphere, and a difference in pressure between the two chambers 12 and 14 of the booster is established. This pressure difference causes a boost force $F_1$ which makes the rigid skirt 20 and the moving cylinder 32 advance.

The hydraulic pressure in the internal volume V of the master cylinder 200 therefore rises and is transmitted, by pipes (not represented) to the brakes 300.

Figure 3:
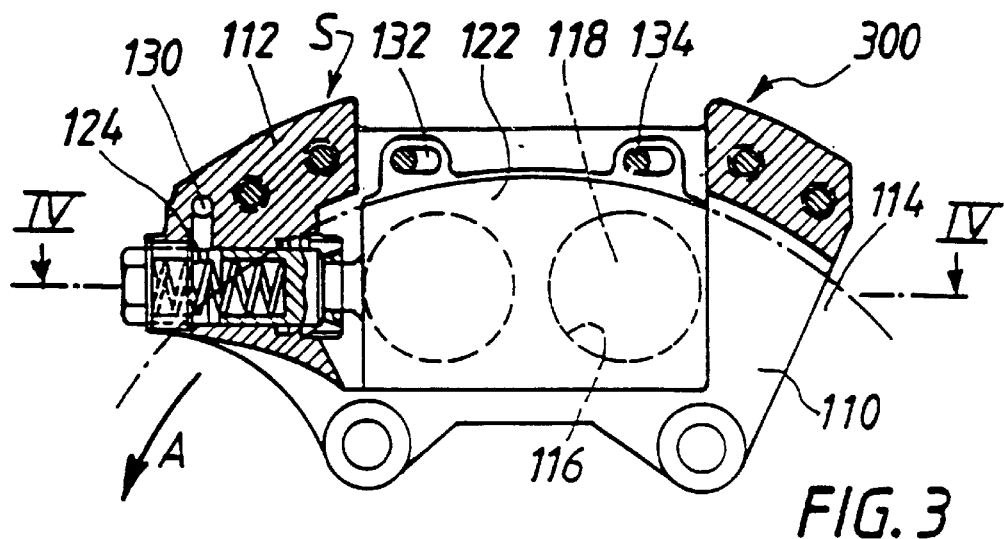
FIG. 3 represents a view in section of a sensor associated with and forming part of the boosted braking system according to the present invention.
Figure 4:
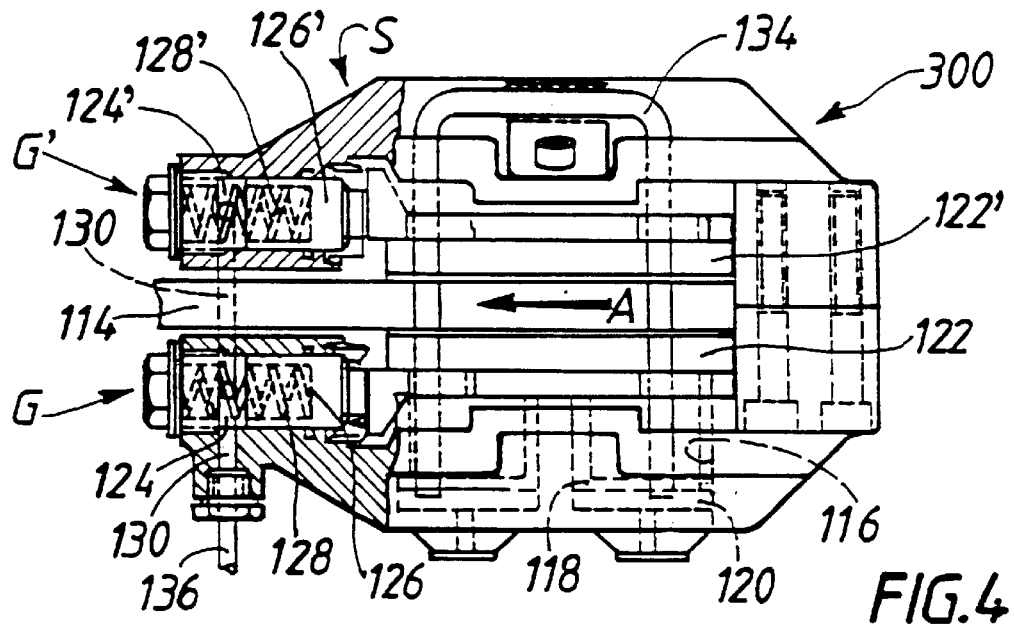
FIG. 4 represents a view in section on IV—IV of the sensor of FIG. 3.

In the example represented in FIGS. 3 and 4, the brakes 300 consist of disc brakes. Such brakes conventionally include a stationary support 110 integral with a stationary part of the vehicle, and a calliper 112 straddling a rotating disc 114 integral with a wheel (not represented) of the vehicle.

The calliper 112 includes at least one cylinder 116 (two in the example represented in FIGS. 3 and 4) in which there slides in leaktight fashion a piston 118 therein delimiting a working chamber 120.

The hydraulic pressure caused by the master cylinder 200 is communicated to the chamber 120 and causes the piston 118 to advance towards a friction pad 122 in order to bring it into contact with the face opposite the disc 114 and thus slow its rotational speed.

If the disc brake 300 is of the fixed calliper type, then on the other side of the disc it includes another chamber (not represented) in which another piston pushes a second friction pad 122' into frictional contact with the other face of the disc 114. If the disc brake 300 is of the sliding-calliper type, then the calliper 112 by reaction presses the other friction pad 122' against the other face of the disc 114.

The friction of the pads 122 and 122' on the disc 114 therefore results in forces applied to the calliper 112 and transmitted to the chassis of the ehicle via the stationary support 110. When the disc 114 is turning in the direction of the arrow A corresponding to the vehicle running forwards, the braking forces are directed towards the part S of the calliper situated downstream with respect to the direction of rotation of the disc, that is to say towards the left-hand part of FIGS. 3 and 4. This part S is also known in the art as the "torque output" part.

The calliper 112 is equipped in this part S with sensors G and G' consisting of bores 124 and 124' arranged on each side of the disc 114 and in which there slide in leaktight fashion sensor pistons 126 and 126' urged by springs 128 and 128' so that they come into abutment on the friction pads 122 and 122'. The bores 124 and 124' thus define sensor chambers which are joined together by a pipe 130.

The friction pads 122 and 122' are mounted in an opening of the calliper 112 and are held therein while at the same time being capable of moving therein. The friction pads 112 and 122' are formed with oblong slots 132 in which the arms of a clip 134 engage, so as to hold the friction pads in the calliper.

As a function of the braking forces caused by the rubbing of the friction pads 122 and 122' on the opposite faces of the disc 114, the friction pads 122 and 122' will exert on the sensor pistons 126 and 126' forces which are proportional to the deceleration of the vehicle.

In effect, for a given vehicle, the deceleration of this vehicle is a function of the braking torque provided by the brake 300, itself a function of the braking pressure supplied by the master cylinder to the working chamber 120 of the brake, and of the coefficient of adherence of the wheels to the ground.

The force with which the friction pads 122 and 22' act upon the sensor pistons 126 and 126' is itself also proportional to the deceleration of the vehicle because the friction pads are subjected, on the one hand, to the braking pressure imparted by the piston 118 and, on the other hand, to the drag of the wheel on the ground, which is a function of the coefficient of adherence of the wheel to the ground, and transmitted to the friction pads by the disc 114.

The pressure in the chambers 124 and 124' is therefore representative of the deceleration of the vehicle and it is transmitted by a pipe 136 to the reaction chamber 36 of the master cylinder 200 and is exerted on the cross-sectional area S of the reaction piston 34.

First of all, the force caused by this pressure exerted on this cross-sectional area S does not exceed the preload at rest of the spring 46, so that the reaction piston 34 remains immobile with respect to the moving cylinder 32, and some distance from the thrust rod 52, no reaction then being felt on the brake pedal. This first phase of operation is represented by the segment AB of the curve in FIG. 5, where there is an increase in pressure in the master cylinder 200 and in the brake 300, and therefore deceleration of the vehicle without variation in the input force. The length of the segment AB is known as the "jump" of the booster.

The booster jump can be set to any desired value by adjusting the preload at rest of the spring 46. For example, as has been represented in FIG. 1, provision may be made for the ring 50 to be threaded and screwed into the moving cylinder 32 to which it transmits at least some of the boost force exerted on the skirt 20 bearing against it.

Screwing the ring 50 into the moving cylinder 32 thus has the effect of compressing the spring 46 and therefore of increasing the preload exerted thereby on the reaction piston 34 towards the master cylinder, that is to say of further increasing the value of the jump.

In order to compensate for the reduction in length which results from screwing the ring 40 into the moving cylinder 32, this ring is, for example, made of two parts screwed together so as to have an adjustable overall length.

It is also possible to envisage the push rod 42 itself being made as two parts screwed together so as to have an adjustable overall length, adjusting this length making it possible especially to alter the opening of the valve when the jump occurs, irrespective of the value given to this jump by screwing the ring 40 into the moving cylinder 32.

In a second phase of operation, the hydraulic pressure increases in the chambers 124, 124' and 36 and reaches a predetermined value for which, applied to the cross-sectional area S of the reaction piston 34, it becomes sufficient to overcome the preload at rest of the spring 46. The reaction piston 34 then moves backwards and comes into contact with the push rod 42, as illustrated by the point B on the curve in FIG. 5. Advantageously, a buffer piece 45 made of rubber or some other elastomeric material may be provided at the rear of the reaction piston 34 and/or at the front of the push rod 42 to deaden the impact of this contact and the resulting noise.

The reaction piston 34 then exerts on the push rod 42 and on the brake pedal a reaction force which depends on the pressure prevailing in the reaction chamber 36 and therefore depends on the deceleration of the vehicle, opposing the input force and thus allowing this deceleration to be controlled by the input force, as represented by segment BC on the curve in FIG. 5.

The slope of this segment BC represents the boost ratio of the braking system. This boost ratio is also equal to the ratio of the cross-sectional area $S_1$ of the moving cylinder 32 (FIG. 1) to the cross-sectional area S of the reaction piston 34.

The brake 300 equipped with sensors G and G' will preferably be situated at the front of the vehicle. This is because the braking of the front wheels of the vehicle is always more intense than the braking by the rear wheels. The sensors such as G and G' will therefore provide a more accurate measurement of the braking parameters.

Advantageously the brakes with which the front wheels of the vehicle are equipped will all be equipped with sensors such as G and G', the sensor chambers 124 and 124' all being linked together hydraulically by the pipe 136. In this way, the pressure prevailing in the reaction chamber 36 will represent the mean of the pressures caused by the sensors situated on the brakes of the front right and left wheels.

The boost force reaches its maximum when the pressure in the rear chamber of the booster reaches atmospheric pressure, and can therefore not increase further. The phenomenon known by the name of saturation and represented by the point C on the curve in FIG. 5 is then reached.

Beyond the point C, that is to say on the segment CD, the boost force $F_1$ remains constant and any increase in deceleration of the vehicle is obtained by a corresponding increase in the input force $F_2$.

The operation of the braking system just described is reproduced for each braking action irrespective of the rate of application of the input force to the control rod 26.

When the driver releases his force, the effect of the communication being re-established, via the valve 24, between the front and rear chambers is to make the moving partition 16 and the moving cylinder 32 retreat under the effect of the spring 25 and to make the pressure in the interior volume V of the master cylinder drop. This drop in pressure is communicated to the working chamber 120 of the brakes 300, and this results in a reduction in the deceleration of the vehicle.

This also results in a drop in pressure in the chambers 124 and 124' of the sensors G and G', which drop is communicated to the reaction chamber 36 of the aster cylinder by the pipe 136. The spring 46 then ushes the reaction piston 34 forwards and the various moving parts then resume their position of rest illustrated in FIGS. 1 to 4.

Figure 6:
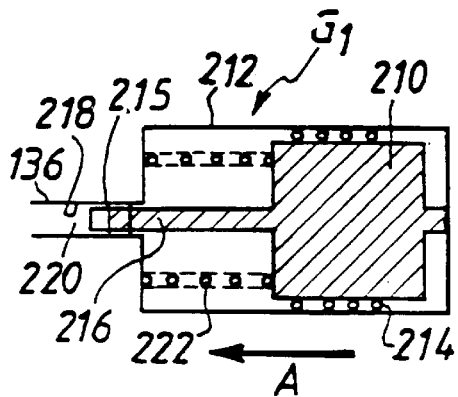
FIG. 6 diagrammatically represents a second embodiment of a sensor associated with the boosted braking device of FIG. 1.

FIG. 6 represents a second embodiment of the sensor described earlier, more specifically intended for cases when it is desired to profit from the advantages of the present invention, but without having to modify the wheel brakes already on a vehicle.

According to this second embodiment, the sensor $G_1$ consists of an inertial mass 210 which can move in a housing 212, for example by means of a ball bearing or roller bearing 214. The housing 212 is arranged in the vehicle in such a way that its axis is parallel to the direction of travel of the vehicle.

The inertial mass 210 is integral towards the front with a piston 216 sliding in leaktight fashion thanks to at least one annular seal 215 in a bore 218 forming the sensor chamber 220, connected by the pipe 136 to the reaction chamber 36. The inertial mass 210 is in addition urged towards the rear of the vehicle by a spring 222 so that it comes into abutment against the back end of the housing 212.

As in the preceding embodiment, during a braking action, and as a function of the intensity of this braking action, the inertial mass 210 will be urged towards the front of the vehicle to a greater or lesser extent (Arrow A in FIG. 6). In this movement, it moves the sensor piston 216 which in turn compresses the fluid contained in the sensor chamber 220, connected by the pipe 136 to the reaction chamber 36. The boosted braking system thus operates in the same way as has already been described.

Figure 7:
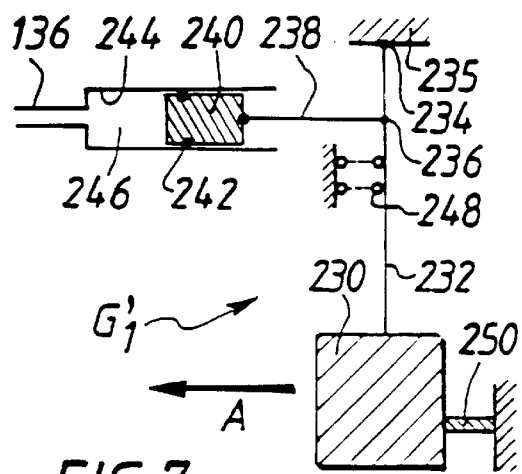
FIG. 7 represents a diagrammatic view of an alternative form of the sensor of FIG. 6.

According to the alternative form represented in FIG. 7, the sensor $G'_1$ includes an inertial mass 230 [lacuna] is integral with one end of a lever 232 articulated by its other end 234 on a stationary part 235 of the chassis or bodywork of the vehicle. At a point 236 part way along the lever 232 is articulated one end of a connecting rod 238 which is articulated by its other end on a piston 240. The axes of the articulations 234 and 236 are horizontal and are perpendicular to the direction of travel of the vehicle.

The inertial mass 230 or the lever 232 are urged backwards by a tension spring 248 or, as has been represented, a compression spring, so that they come into abutment towards the rear with a stationary part 250 of the chassis or bodywork of the vehicle. In addition, when the vehicle is stationary or is running at constant speed on horizontal ground, the lever 232 is substantially vertical in this position of abutment against the stationary part 250.

The piston 240 slides in leaktight fashion thanks to at least one seal 242 in a bore 244 forming a sensor chamber 246 connected to the reaction chamber 36 by the pipe 136.

According to this alternative form, under a braking action and as a function of the intensity of this braking action, the inertial mass 230 will be urged towards the front of the vehicle to a greater or lesser extent (arrow A in FIG. 7), adopting a movement of rotation about the articulation 234. In this movement, thanks to the connecting rod 238, it imparts a movement of translation to the piston 240 which in turn compresses the fluid contained in the sensor chamber 246 connected by the pipe 136 to the reaction chamber 36. The boosted braking system therefore operates in the way which has already been described.

Figure 8:
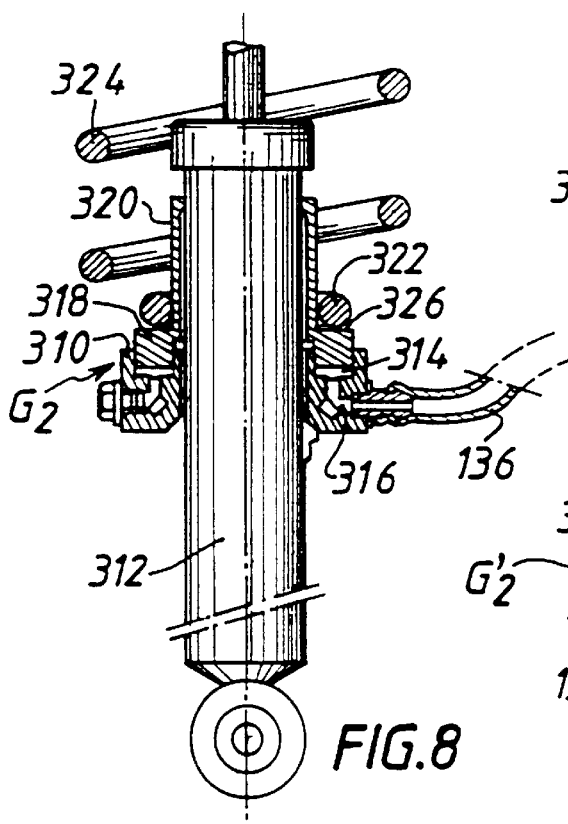
FIG. 8 represents a view in part section of a third embodiment of the sensor associated with the boosted braking device of FIG. 1.

In the embodiment illustrated in FIG. 8, the sensor $G_2$ comprises an annular collar 310 mounted stationary on a damper 312 and has an annular groove 314 connected to the pipe 136 via a passage 316. The damper 312 is associated with a front wheel of the vehicle. An annular piston 318 is mounted so that it can slide in leaktight fashion in the annular groove 314 and has a tubular sleeve tube 320 which is arranged ith a small amount of clearance around the damper 312. One end 322 of the suspension spring 324 comes to bear against an annular surface 326 of the annular piston 318.

Upon a braking action, the load supported by the front damper 312 of the vehicle increases as a function of the intensity of the braking and of the resulting deceleration, this phenomenon being known by the name of "load transfer". This increase in load on the front damper causes a corresponding variation in the force exerted by the suspension spring 324 on the annular piston 318, leading to a variation in the effective pressure in the sensor chamber formed by the annular groove 314. This variation in pressure is transmitted by the pipe 136 to the reaction chamber 36. The boosted braking system therefore operates in the way which has already been described.

Figure 9:
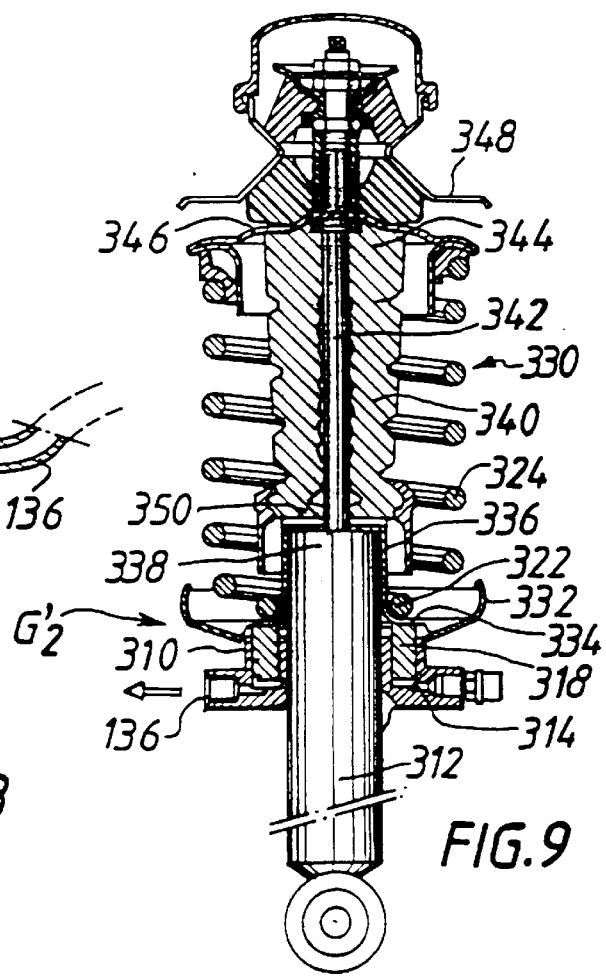
FIG. 9 represents a view in part section of an alternative form of the sensor of FIG. 8.

According to the alternative form represented in FIG. 9, the suspension element 330 includes a bearing element 332 which is mounted so that it can slide around the damper 312 and which is in abutment against the annular piston 318 of the sensor $G'_2$. The bearing element 332 includes an annular part 334 against which the end 322 of the suspension spring 324 comes to bear, and a cylindrical part 336 which surrounds one end 338 of the damper 312. The suspension element 330 additionally includes a sleeve tube 340 made of elastomeric material arranged around a rod of the piston 342 of the damper 312 and one end 344 of which is mounted stationary on a support plate 346 integral with the chassis 348 of the vehicle.

The sleeve tube 340 has a length which is such that when the vehicle on which the device is mounted is stationary or running at constant speed, the end 350 is situated a small distance from the bearing element 332. In these conditions, only the force of the suspension spring 324 is transmitted to the annular piston 318. If the load of the damper 312 increases owing to a deceleration of the vehicle, then the damper 312 is compressed and the end 350 of the sleeve tube 340 comes into abutment against the part 336 of the bearing element 332 in order to exert an additional force on the annular piston 318. This results in an increase in pressure in the sensor chamber 314, transmitted by the pipe 136 to the reaction chamber 36.

As in the first embodiment, the dampers with which the front wheels of the vehicle are equipped will preferably all be fitted with sensors such as $G_2$ or $G'_2$, the sensor chambers 314 all being linked fluidicly via the pipe 136. In this way, the pressure prevailing in the reaction chamber 36 will represent the mean of the pressures caused by the sensors situated on the dampers of the right and left front wheels.

The advantage of this third embodiment lies in the fact that an additional parameter is taken into account to improve the feel felt by the driver when he depresses the brake pedal. This is because the deceleration measured by the sensors such as $G_2$ or $G'_2$ takes account of the braking pressure caused by the master cylinder, of the adherence of the front wheels to the ground, and also of the total load supported by the front axle. This load may vary, for example in the case of a rear-engined vehicle with a luggage compartment at the front.

Thus according to the present invention, a boosted braking system has indeed been achieved which has improved operating characteristics because it allows the driver of the vehicle to control very precisely the deceleration of his vehicle and therefore to adapt his braking force as a function of the instantaneous adherence of the wheels of the vehicle to the ground. The means used to obtain this result are relatively simple and therefore of low cost and operate reliably in all circumstances.

It may also be seen that the reaction chamber 36/pipe 136/sensor chambers 124, 124' assembly contains a constant and closed volume of fluid. The result of this is that those skilled in the art will be able to choose the cross-sectional area S of the reaction chamer 36 and the cross-sectional areas of the sensor chambers 124 and 124' at will so as to change the slope of the segment BC of the curve in FIG. 5 without changing the other operating conditions.

Of course the present invention can be altered in numerous ways which will be obvious to those skilled in the art and which fall within the context of the present invention. Thus for example the invention may with equal ease be applied to fixed-calliper or sliding-calliper disc brakes, or to drum brakes. Likewise, the booster used may be a single one or a tandem booster.

We claim:

1. A boosted braking system for a motor vehicle, comprising a master cylinder full of brake fluid and equipped with a main hydraulic piston for receiving an actuating force composed of an input force and a boost force, said input force and boost force both acting in an axial direction to cause an increase in the pressure of brake fluid presented to at least one wheel brake, and a pneumatic booster controlled by the application of said input force which acts on a control rod integral with a plunger to control the opening of a three-way valve for exerting said actuating force on said main hydraulic piston, said booster including a rigid casing divided in leaktight fashion into at least first and second chambers by means of at least one moving partition acted on by a difference in pressure between said first and second chambers resulting from the opening of said three-way valve and driving a pneumatic piston which moves with respect to said casing and carries said three-way valve to transmit said boost force to said main hydraulic piston, said main hydraulic piston including a hollow moving cylinder which receives at least some of said boost force, a reaction piston which slides in a leaktight fashion in the axial direction inside of said hollow moving cylinder, said reaction piston receiving at least the input force, elastic means exerting an elastic force between said reaction piston and said moving cylinder for urging said reaction piston towards the master cylinder, characterised in that said reaction piston delimits in the moving cylinder a reaction chamber which is isolated from an interior volume of the master cylinder and which receives hydraulic pressure supplied by at least one sensor sensitive to variations in at least one physical magnitude in response to the variations in the input force prevails.

2. The boosted braking system according to claim 1, characterised in that said reaction chamber is in permanent communication with an opening in a body of said master cylinder via a duct formed in said moving cylinder emerging in a peripheral groove of the moving cylinder upon moving past said opening.

3. The boosted braking system according to claim 2, characterised in that said sensor includes at least one bore in which slides in leaktight fashion a sensor piston defining a sensor chamber which is connected by a pipe to said reaction chamber of said moving cylinder.

4. The boosted braking system according to claim 3, wherein said wheel brake includes at least one friction pad which is brought into frictional contact with a rotating element integral with a wheel of the vehicle when the brake fluid pressure in the wheel brake increases, characterised in that said sensor piston is urged into abutment with the friction pad by a second elastic means.

5. The boosted braking system according to claim 4, characterised in that said rotating element is integral with a front wheel of said vehicle.

6. The boosted braking system according to claim 5, characterised in that said rotating element is a disc.

7. The boosted braking system according to claim 3, characterised in that said sensor includes at least one inertial mass which is moved in a direction parallel to the direction of travel of said vehicle and to shift said sensor piston in said bore.

8. The boosted braking system according to claim 7, characterised in that said inertial mass is integral with a lever articulated on a stationary part of said vehicle, said lever having a rod connected with said sensor piston.

9. The boosted braking system according to claim 3, characterised in that said sensor includes a sensor piston subjected to the action of a suspension spring associated with a damper of the vehicle.

10. The boosted braking system according to claim 9, characterised in that said damper is associated with at least one front wheel of the vehicle.

* * * * *